Patented Aug. 9, 1949

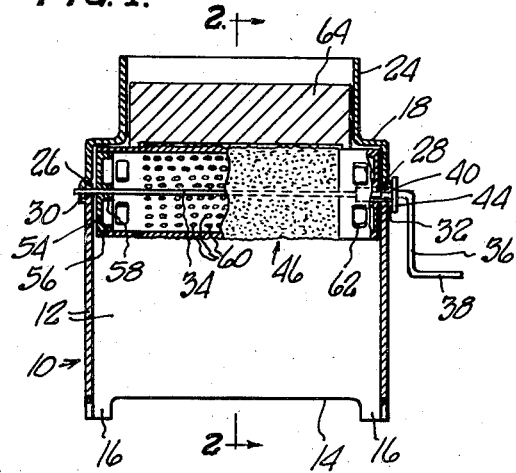
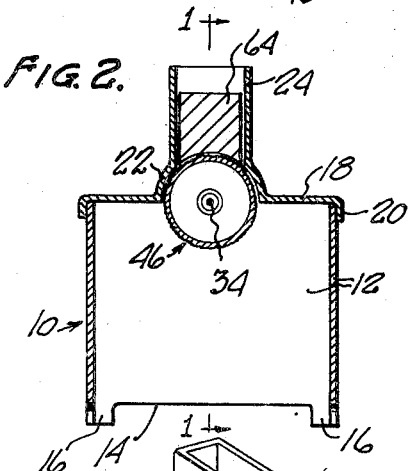
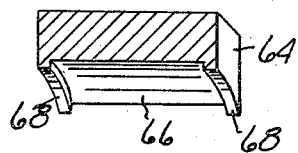

2,478,449

UNITED STATES PATENT OFFICE 2,478,449

FOOD GRATER WITH ROTATABLE CYLINDER

Arthur Baer, South Bend, Ind.

Application October 25, 1946, Serial No. 705,765

2 Claims. (Cl. 146—177)

This invention relates to improvements in food graters, and more particularly to a device of this character which is adapted to be used in the home for use in grating foods, such as potatoes, horseradish, and the like.

The primary object of the invention is to provide a simple device which is inexpensive in construction, easy to use and operate, which can be readily assembled and disassembled, and which is adapted to fit within a round bowl or dish while being used.

A further object is to provide a device of this character which can be so disassembled that all parts thereof can be handled easily for cleaning thereof and which is provided with a cylindrical grating cylinder which can be likewise disassembled to permit cleaning of the interior thereof.

A further object is to provide a device of this character having a grating cylinder which has openings therein for discharge of food collected within the cylinder during use of the device.

A further object is to provide a device of this character including a cylindrical grating cylinder with a member adapted to force food against the grating cylinder, which member is provided with ribs to engage the cylinder at points spaced from the grating surfaces thereof to avoid engagement of the pressing member with the grating surface and at the same time effectively feed material to the grater.

Other objects will be apparent from the following specification.

In the drawing:

Fig. 1 is a longitudinal vertical sectional view taken on line 1—1 of Fig. 2.

Fig. 2 is a transverse vertical sectional view taken on line 2—2 of Fig. 1.

Fig. 3 is a perspective view of the device in its assembled condition.

Fig. 4 is a detail perspective view of the crank unit of the device.

Fig. 5 is a perspective view of the grating cylinder used in the device.

Fig. 6 is a perspective view of the presser member with parts shown in section.

Referring to the drawing which illustrates the preferred embodiment of the invention, the numeral 10 designates a base unit which is formed with vertical side and end walls 12, preferably of the same length and of the same height. The lower edge of each of the walls 12 at the central portion thereof is cut out at 14 to provide downwardly projecting leg portions 16 at the corners of the member 10. The member 10 is preferably formed from sheet metal and is open at its bottom and its top as illustrated. A cover member or plate 18, also formed of sheet metal, has marginal depending flanges 20 which fit around the walls 12 of the base and a central longitudinally extending upwardly projecting part-spherical portion 22 which extends for the full length of the cover. A tube or hopper 24 extends upwardly from the portion 22 at the center thereof and provides a vertically extending guide passage open at its inner end.

Opposite upper edges of the walls 12 of the base are notched at 26 and 28 at the center thereof and substantially concentric with the part-spherical projection 22 of the cover 18. The flanges 20 of the cover 18 are similarly notched at 30 and 32. A crank of the construction best illustrated in Fig. 4 is journaled in the registering slots 26, 30 and 28, 32. The crank is preferably formed of wire and includes an elongated portion 34 of a length greater than the length of the wall 12, a perpendicularly bent portion 36 at one end of the shaft portion 34, and a handle portion 38 parallel to and offset from the shaft portion 34. A sleeve 40 is secured to the end of the shaft 34 adjacent the part 36 and includes a flat 42 formed thereon and extending for only a portion of the length of the sleeve 40. A washer 44 or an enlarged shoulder is formed upon or fixedly secured to the sleeve 40 at the end thereof adjacent the crank part 36. The crank is so constructed that the sleeve 40 is journaled in the registering notches 28, 32 when the enlargement 44 bears against the flange 20 of the cover as illustrated in Fig. 1. In this position of the parts, the flat 42 is spaced inwardly from the housing parts 12 and 20. The shaft portion 34 is of sufficient length that the free end thereof projects through the registering notches 26 and 30 to be journaled in the housing parts.

A cylinder 46, preferably of the character illustrated in Fig. 5, is formed of sheet metal. This cylinder is of a length only slightly shorter than the length of the wall 12 of the device so that it is free to rotate therein when mounted upon the shaft 34 of the crank. The cylinder 40 is preferably formed of sheet metal, and an end wall 48 closes one end thereof. The end wall 48 has an opening 50 therein which is adapted to fit slidably and snugly upon the sleeve 40 at the end thereof provided with the flat 42. Thus, as will be seen from Fig. 5, the opening 50 is not a complete circular opening but is provided with a straight edge portion 52 adapted to fit against the flat 42 so that it will rotate with the rotation of the sleeve 40. The opposite end of the cylinder 46 is open, as best illustrated in Fig. 1, and is adapted to receive an end wall 54 having flanges 56 fitting snugly within the cylinder 46. The end plate 54 has a central tubular portion 58 adapted to fit slidably and rotatably upon the shaft 34 of the crank. The body of the cylinder for the major portion of its length at the center thereof is suitably formed for grating purposes with a roughened exterior surface. This exterior roughening may be formed in any desired manner as by punching a plurality of close spaced holes 60 in the metal from the inner surface outwardly, thereby leaving the roughened edges around the openings as the means adapted to cut and grate food pressed thereagainst. The cylinder 46 is also preferably provided with a plurality of large openings 62 intermediate and spaced from the ends of the cylinder and the adjacent roughened portion 60 of the cylinder for purposes to be hereinafter set forth.

A presser member 64 fits slidably within the guide formed by the tube 24 and has a concave bottom surface 66 and ribs 68 having concave surfaces projecting slightly beyond the concave central surface 66 at the opposite ends of the member 64. The spacing between the ribs 68 is preferably slightly greater than the length of the roughened portion 60 of the cylinder so that the ribs 68 are adapted to bear against the smooth parts of the cylinder between the roughened portion 60 and the openings 62 of the cylinder.

It will be observed that the device is easily assembled by first assembling the cylinder with its end plate 54 mounted therein and then extending the shaft 34 of the crank through the cylinder, passing said shaft through the cylinder from the right as viewed in Fig. 5, whereby the opening 50 engages the sleeve 40 at the flat of said sleeve, and the opposite end of the shaft 34 extends through the sleeve 58 in the wall 54 of the cylinder. The complete cylinder assembly is then applied to the base 10 with the sleeve 40 resting in the notch 28 of the base, and the free end of the shaft of the crank resting in the notch 26 of the base. Thereupon the cover 18 can be applied to the device with its flanges 20 fitting around the base portion, and the notch 30 receiving and retaining the free end of the crank shaft 34, and the notch 32 fitting around the cylindrical portion of the sleeve 40 adjacent the flange or enlargement 44. The food to be grated can then be inserted into the passage defined by the tube 24 and the presser member 64 can likewise be inserted in the guide passage 24 to press food downwardly against the top of the cylinder. The device is then ready to be operated by grasping the crank handle 38 and rotating the same. Inasmuch as the device is open at its bottom and is substantially square in cross-section, it will fit solidly in a large bowl or dish, and the grated food discharged from the device falls directly into the bowl. The device may be held at the projecting part 24 thereof to steady it while the crank is being rotated as well as to apply pressure by the fingers to the pressure member 64.

The cylinder is so proportioned to the cylindrical offset portion 22 of the cover that the cylinder is freely rotatable but with only a slight clearance with the cylindrical wall portion 22 of the cover, as best illustrated in Fig. 2. This insures that the food will be grated or cut into particles of small size as is desired and prevents sizable food particles from passing through and being discharged from the device. The ribs 68 of the presser member depend only slightly from the concave surface 66 by the extent necessary to provide clearance between the roughened surface 60 of the cylinder and the surface 66 of the presser. Consequently, it is possible to completely grate a vegetable, such as a potato, without the necessity of the fingers of the user engaging the roughened grating surface of the cylinder.

When the use of the device has been completed, the device can be disassembled into its various component parts and all surfaces of all of the parts are readily accessible to be completely washed and cleaned, thereby assuring a sanitary condition of the device at all times. This is accomplished by a reverse procedure to that of the assembly of the device as mentioned above, and entails the removal of the cover 18 from the base 10, the removal of the presser from the cover, the removal of the cylinder as a unit from the base 10, and the disassembly of the crank unit shown in Fig. 4 from the cylinder, together with the removal of the end cap 54 from the cylinder. In this connection it will be observed that this leaves the cylinder unit 46 open at one end for easy access of a brush therein for cleaning the interior thereof and dislodging particles of food which may collect therein during use from the openings 60.

Inasmuch as it is proposed to provide the roughened surface of the grating cylinder by means of openings pressed from the inside to leave roughened marginal parts around the openings, it is possible for the material being grated to pass through the openings 60 during the grating operation. To avoid collection and retention of substantial amounts of grated food within the cylinder, the openings 62 are provided within the cylinder. These are of such a size that grated food may pass freely therethrough. The operation of the device by turning of the crank shaft 34 will entail a certain amount of vibration of the unit as the roughened surface acts upon the vegetable or other food product being grated, and this combined with the rotation of the cylinder will serve to continually agitate the grated food products which may collect within the cylinder and permit them to be fed to a position lengthwise of the cylinder at which they can pass freely through the openings 62.

While the device has been described herein as being formed from sheet metal, it will be understood that it may be formed from any other material found suitable, for example, from plastic material, with the possible exception of the crank element. Likewise, while the construction herein shown and described is preferred, it will be understood that changes may be made in the construction within the scope of the appended claims without departing from the spirit of the invention.

I claim:

1. A food grater comprising a housing open at its top and bottom and having opposed notches in its top marginal portion, a crank having a shaft portion spanning said housing and journaled in said notches, a cylindrical grating element, having end portions each fitting slidably and concentrically on said crank shaft, means effecting a drive transmitting connection between said crank and one end portion of said grating element, a cover spanning said housing and having a central opening, and a feed tube carried by said housing at said opening, at least a portion of said cover around said opening being concentric with and close spaced relative to said grating element, said grater cylinder being hollow and having large openings in the ends of its periphery from said cover opening.

2. A food grater comprising a housing open at its top and bottom and having opposed notches in its top marginal portion, a crank having a shaft portion spanning said housing and journaled in said notches, a cylindrical grating element fitting slidably and concentrically on said crank shaft, means effecting a drive transmitting connection between said crank and grating element, a cover spanning said housing and having a central opening, and a feed tube carried by said housing at said opening, at least a portion of said cover around said opening being concentric with and close spaced relative to said grating element, said grater cylinder being hollow and having at least one open end, and a centrally apertured end plate detachably secured at said open end, the central portion of said cylinder having a roughened outer cylindrical surface registering with said cover opening and comparatively large openings intermediate said roughtened portion and the ends of said cylinder and spaced from said cover opening.

ARTHUR BAER.

REFERENCES CITED

The following references are of record in the file of this patent:

UNITED STATES PATENTS

| Number | Name | Date |
| --- | --- | --- |
| 231,416 | Fine et al. | Aug. 14, 1880 |
| 425,472 | Turnbull | Apr. 15, 1890 |
| 739,836 | Cremer | Sept. 29, 1903 |
| 1,106,931 | Donisi | Aug. 11, 1914 |
| 1,538,609 | Barnett | May 19, 1925 |
| 1,756,779 | Andrusis | Apr. 29, 1930 |

FOREIGN PATENTS

| Number | Country | Date |
| --- | --- | --- |
| 38,470 | Sweden | Mar. 3, 1915 |
| 778,982 | France | Jan. 5, 1935 |